United States Patent [19]

Schnause

[11] 4,244,903

[45] Jan. 13, 1981

[54] MANUFACTURE OF FLOWABLE COMPOSITE PARTICULATE MATERIAL

[76] Inventor: Rolf Schnause, Flurstrasse 14, 8501 Eckental, Fed. Rep. of Germany

[21] Appl. No.: 843,699

[22] Filed: Oct. 19, 1977

[30] Foreign Application Priority Data

Oct. 22, 1976 [DE] Fed. Rep. of Germany ....... 2647944

[51] Int. Cl.³ .................... B29C 17/00; B29C 29/00
[52] U.S. Cl. .................................. 264/68; 264/37; 264/118; 264/122; 264/142
[58] Field of Search ............................. 264/140–142, 264/37, 268, 68, 118, 122; 425/205, 313, 382, DIG. 230; 366/69, 83, 87, 79, 89

[56] References Cited

U.S. PATENT DOCUMENTS

| 3,108,320 | 10/1963 | Daester | 264/142 |
| 3,193,601 | 7/1965 | Billingsley | 264/142 |
| 3,577,494 | 5/1971 | Chisholm et al. | 264/143 |
| 3,712,776 | 1/1973 | Woodham et al. | 366/89 |
| 3,817,675 | 6/1974 | Maiocco | 264/68 |
| 3,866,890 | 2/1975 | Tadmor et al. | 264/68 |
| 3,988,406 | 10/1976 | Nakamura et al. | 264/118 |
| 4,016,233 | 4/1977 | Pringle | 264/122 |
| 4,057,607 | 11/1977 | Soehngen | 264/141 |
| 4,108,935 | 8/1978 | Moneghan | 264/68 |

FOREIGN PATENT DOCUMENTS

1243285 12/1965 United Kingdom ....................... 264/68

OTHER PUBLICATIONS

McKelvey, "Polymer Processing", Wiley, N.Y. (1962), p. 285.
Modern Plastics Encyclopedia (1965) p. 594, McGraw-Hill (N.Y.)
Anon., Modern Plastics Encyclopedia, McGraw-Hill, N.Y., (1965) p. 59.

*Primary Examiner*—James B. Lowe
*Attorney, Agent, or Firm*—Fleit & Jacobson

[57] ABSTRACT

The moldings are manufactured from synthetic thermoplastics, from non-thermoplastic fibrous flakes, which are available in an uncoated or incompletely coated state, and from optionally admixed fillers. The fibrous flakes and the thermoplastic material are mixed under the action of pressure and heat to produce a precompacted composite material, in which the fibrous flake material constitutes about 65% or more by volume of the composite material, and the latter is then extruded and is subsequently finally shaped and finally compacted at the same time. To manufacture the precompacted composite material, the non-thermoplastic materials consisting of the fibrous flake material and of any fillers, as well as synthetic thermoplastics which are adapted to adhere to the fibrous flake material, are subjected to a pretreatment, by which the thermoplastic and non-thermoplastic materials are extruded at elevated temperature and are thus bonded together and the extrusions are subsequently chopped to form a flowable composite particulate material.

5 Claims, 4 Drawing Figures

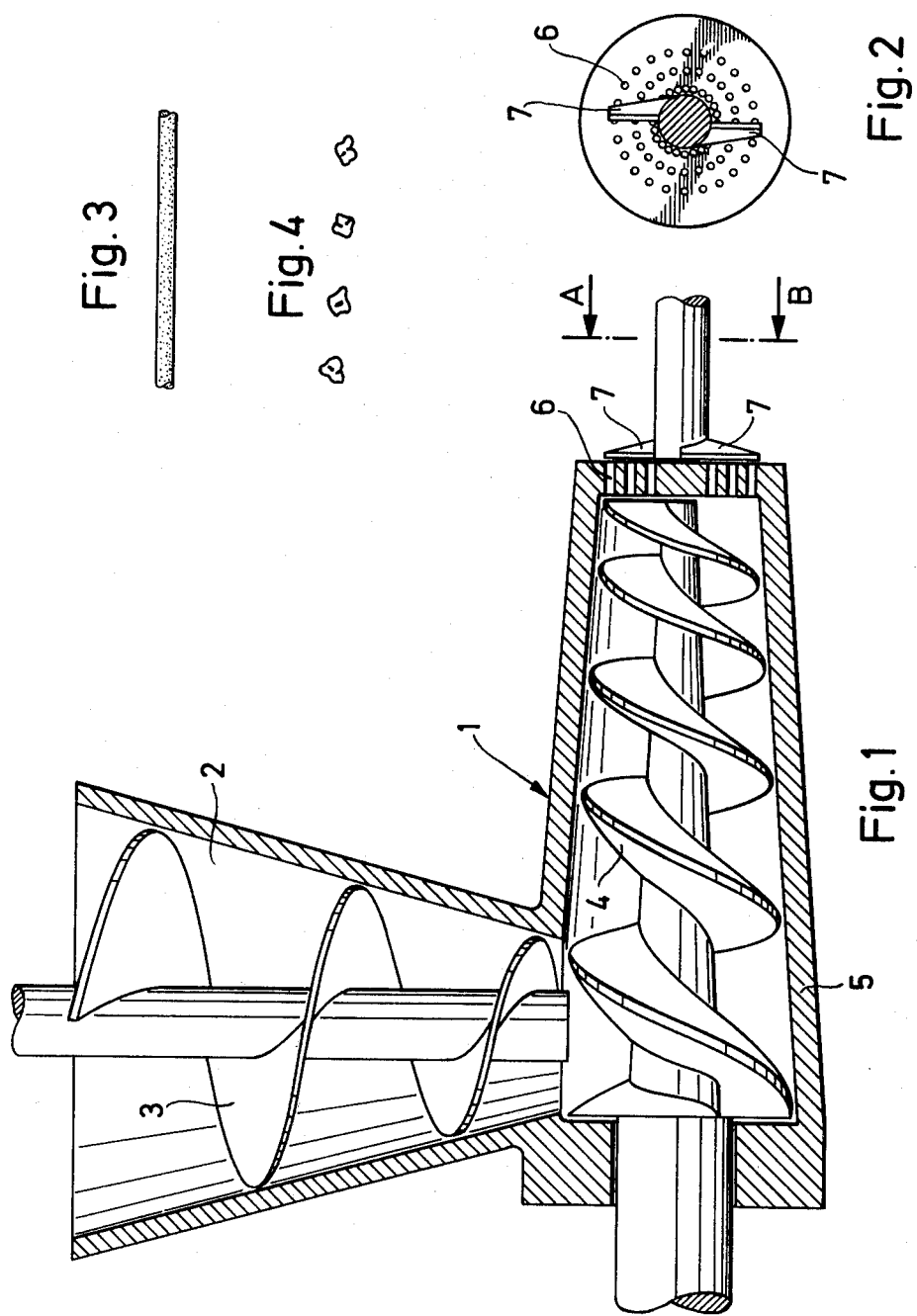

MANUFACTURE OF FLOWABLE COMPOSITE PARTICULATE MATERIAL

This invention relates to a process of manufacturing moldings of synthetic thermoplastics, non-thermoplastic fibrous flakes, which are available in an uncoated or incompletely coated state, and optionally admixed fillers, which process comprises addition of flakes to the thermoplastic material under the action of pressure and heat to produce a precompacted mixture, in which the fibrous flake material constitutes about 65% by volume or more of the entire mixture, which is then extruded and is subsequently finally shaped and finally compacted at the same time.

In that known process the mixing and precompacting actions result in the formation of a coating of the thermoplastic material on the fibrous flakes. That coating is important for the quality of the final molding because the thermoplastic material prevents an escape of the air which is contained in the fibrous material when the mixture is subsequently finally compacted. The retention of such air is essential for the manufacture of a nailable material because such material must be locally compressible unless it consists of an elastomer, such as rubber, which permits of a displacement of material in larger regions because it has an elongation much higher than 100%. When material containing entrapped air is being nailed, the entrapped air which is present in a microfine distribution yields to the material which is being displaced and such air can elastically take up the shock loads. These two capabilities are highly desired, e.g., in wood. When the mixture is finally shaped and finally compacted, the plastics material is forced into the fibrous material under the action of pressure and heat. The mixture can be completely compacted under a pressure which is so high that a layer of plastics material is formed on the surface of the molding and can then be cooled to the solidification temperature of the thermoplastic material. Depending on the intended use of the molding, the known process permits of a manufacture of moldings having a thermoplastic surface and of moldings having no thermoplastic surface. Whereas the molding has a high content of hydrophilic fibrous material, such as paper, it has hydrophobic properties because the fibrous flakes are enclosed on all sides by thermoplastics material, which has penetrated into the flakes. This property is exhibited by the molding made by the known process not only on its thermoplastic surface but also in its interior so that a molding which has been cut open remains hydrophobic.

It is an object of the invention to provide a process by which moldings can be manufactured which have material properties that are equivalent to or improved over those of the moldings manufactured by the known process and which can be manufactured at lower costs.

In a process of the kind described first hereinbefore, this object is accomplished in that the non-thermoplastic materials consisting of the fibrous flakes and any filler, as well as the synthetic thermoplastics, which are adapted to adhere to the fibers, are subjected to a pretreatment, by which the thermoplastic and non-thermoplastic materials are extruded at elevated temperature and are thus bonded together and the composite extrusions are subsequently chopped to form a flowable composite particulate material. Because the flowable particulate material which is made according to the invention has a much higher bulk density than the mixture of flake and thermoplastic materials used in the known process, the screw channels of the extruder which is used just as in the known processes can be filled more completely with the starting material and the capacity of the extruder and the heat transfer from the extruder wall to the material to be extruded are improved. Another advantage afforded by the more complete filling of the screw channels resides in that there is no periodic fluctuation of the rate at which the plastic mix is extruded ("surging"), so that various disadvantages which may otherwise be involved in the rhythmically pulsating extrusion are eliminated and there is no longer a danger of a failure of the extrusion in shears and of an unnecessarily long exposure of the mixture to elevated temperatures in the extruder and in the mold. The exposure of the mixture to elevated temperatures is detrimental to the material properties of the molding and is also avoided by the invention. Another advantage which is afforded resides in that the output capacity of the extruder is increased and the plasticizing costs are lowered.

It is apparent that the process according to the invention permits of a manufacture of moldings which have material properties that are equivalent to or improved over those of the moldings manufactured with the known process and the costs of manufacturing the moldings can be reduced because the extruder can be fed with a flowable particulate material having a bulk density of 200 to 500 grams per liter. In that case the compaction ratio in the extruder is only about 1:2 to 1:3.5. Such compaction ratios can be satisfactorily obtained even with a double-screw extruder. As the screw channels in the mixing zone are completely filled, the extruder can be operated at full capacity without surging.

The advantages afforded by the use of flowable particulate materials over the known process can be summarized as follows: Owing to the more complete filling of the screw channels of the extruder and the higher density and the resulting higher thermal conductivity of the composite material, the material is more rapidly heated in the extruder and for this reason is less subjected to the action of heat than the mixture of flakes and thermoplastics used in the known process. The need to provide the extruder with a feed hopper provided with a stirrer and a stuffing screw can be eliminated. The volumetric rate at which the material is fed to the extruder is reduced to only slightly more than one-third of the rate at which the mixture of flake and thermoplastic materials is fed in the known process. The costs of manufacturing the moldings are substantially reduced because the compounding involves the same labor expenditure as the shredding by which the flakes were produced before. Whereas the machine is more expensive, it does not involve a higher labor expenditure because one and the same operator can initiate and supervise the shredding compounding operations.

According to a further feature of the invention the discrete composite particles which partly adhere to each other are cooled in an air stream and are disintegrated into individual composite particles. This will facilitate the feeding of the extruder.

According to a particularly preferred embodiment of the invention, the fillers, such as sawdust, are admixed before the thermoplastic material admixed to the fibrous flakes is plasticized. In that case, additives having a specific gravity which differs from that of the mixture of flake and thermoplastic materials can be added at a metered rate in the feed hopper of the extruder without a risk of a segregation resulting from the agitation in the feed zone of the extruder. The fillers, such as sawdust, may be added to the material which is to be compounded or may be directly added at a metered rate to the feed hopper of the extruder. In experiments it has been proved that satisfactory results can be obtained when up to 40% sawdust are added in the manufacture of moldings having wall thicknesses of only 1.5 mm and when up to 60% sawdust are added in the manufacture of moldings having wall thicknesses of 5 mm.

Within the scope of the invention, random fiber material rather than flakes may be used as starting material. It is known that random fiber material may have a bulk density which is as low as 10 grams per liter. It has not been possible so far to process fibrous flakes having an area below 1 to 10 mm$^2$ or even random fiber materials because in such case the bulk density would be so low that they can no longer be fed into the extruder. Only the process according to the invention permits of a processing even of loose random fiber materials in the extruder in the manufacture of moldings or sections.

The invention will be explained hereinafter by way of example with reference to the drawing, which shows equipment for carrying out the process according to the invention and in which FIG. 1 is a sectional view showing an extruder, FIG. 2 is a sectional view taken on line A–B in FIG. 1, FIG. 3 shows an extrusion consisting of a thermoplastic molding composition and FIG. 4 shows the composite material made according to the invention.

The extruder 1 comprises a feed hopper 2 and a feed screw 3. In a shell 5 of the extruder 1, a compacting screw 4 is arranged, which is disposed below the feed screw and extends at right angles thereto. The shell 5 is closed at one end by a perforated die 6, which is succeeded by a chopping tool 7.

The mixture of thermoplastic material and of fibrous flake material or random fiber material is charged to the feed hopper 2 and delivered by the feed screw 3 to the compacting screw 4. The latter forces the mixture against the perforated die 6 disposed at the end of the shell 5 and through the bores of the perforated die 6. As a result, the fibers are compacted and rodlike extrusions are formed. As the material is forced through the bores, frictional heat is generated, which plasticizes the thermoplastic component so that the non-thermoplastic component is bonded in the extrusions, which correspond in cross-section to the bores of the perforated die. The restoring force of the non-thermoplastic material cannot cause the same to burst. In this phase, the thermoplastic material in each extrusion does not yet enclose the non-thermoplastic material but only bonds the non-thermoplastic elements together.

The extrusions emerging from the bores of the perforated tool 6 are chopped in a length which is approximately as large as their diameter. In the embodiments shown by way of example and used for the experiments, the bores were 3 to 4 mm in diameter.

The extruder shown in FIG. 1 may be modified in that the end of the shell 5 is completely closed and the bores are formed in the shell near the end of the compacting screw 4. In that case the compacted mixture is forced through the bores by scrapers and the chopping tool revolves around the shell 5.

Because the thermoplastic material is plastic as the extrusions emerge from the bores, the particles of the chopped material may adhere to each other. For this reason the agglomerate particles which partly adhere to each other are cooled in an air stream and are disintegrated into discrete composite particles by a cross beater mill.

What is claimed is:

1. A process of manufacturing a flowable composite particulate suitable for use in extrusion molding, comprising:
   (a) charging synthetic thermoplastic to an unheated extruder;
   (b) simultaneously charging and admixing a non-thermoplastic material to the extruder with the proviso that the non-thermoplastic material constitutes about 65% or more by volume of the total charged material;
   (c) extruding the mixture in the absence of external heat through the bores of a perforated die at a rate sufficient to generate frictional heat adequate to bond the thermoplastic and non-thermoplastic materials to one another as they pass through the die, but not before; and
   (d) severing the extrudate into a discrete flowable composite particulate; with the proviso that said flowable composite particulate has a bulk density of from 200 to 500 grams per liter.

2. The process of claim 1, wherein the non-thermoplastic material is selected from the group consisting of fibrous flakes having an area below 10 mm$^2$ and random fibrous material having a bulk density of at least 10 grams per liter.

3. The process of claim 1, wherein the discrete composite particles which partly adhere to each other are cooled in an air stream whereby they disintegrate into individual composite particles.

4. The process of claim 1, wherein the non-thermoplastic material further comprises a filler.

5. The process of claim 4, wherein the filler is admixed before the thermoplastic material is plasticized.

* * * * *